US012048656B2

(12) United States Patent
Moore et al.

(10) Patent No.: US 12,048,656 B2
(45) Date of Patent: Jul. 30, 2024

(54) SUPPORT DEVICES INCLUDING MOVABLE SEGMENTS AND METHODS FOR OPERATING THE SAME

(71) Applicant: Toyota Motor North America, Inc., Plano, TX (US)

(72) Inventors: Douglas A. Moore, Fairview, TX (US); Dario Jose Villarreal Suarez, Farmers Branch, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 1035 days.

(21) Appl. No.: 16/943,286

(22) Filed: Jul. 30, 2020

(65) Prior Publication Data

US 2022/0031538 A1 Feb. 3, 2022

(51) Int. Cl.

| | |
|---|---|
| ***A61G 5/06*** | (2006.01) |
| ***A61G 5/10*** | (2006.01) |
| *A61H 3/00* | (2006.01) |
| *A61H 3/04* | (2006.01) |

(52) U.S. Cl.
CPC ............. *A61G 5/06* (2013.01); *A61G 5/1051* (2016.11); *A61G 2203/10* (2013.01)

(58) Field of Classification Search
None
See application file for complete search history.

(56) References Cited

U.S. PATENT DOCUMENTS

| | | | | |
|---|---|---|---|---|
| 10,137,042 | B2 | 11/2018 | Ishikawa et al. | |
| 2005/0206149 | A1* | 9/2005 | Mulhern .............. | A61G 5/1078 280/755 |
| 2023/0106280 | A1* | 4/2023 | Suzuki ..................... | A61G 5/06 280/5.2 |

FOREIGN PATENT DOCUMENTS

| | | | |
|---|---|---|---|
| CN | 1138825 | A | 12/1996 |
| CN | 201168133 | | 12/2008 |
| CN | 203417301 | U | 2/2014 |
| CN | 103300981 | B | 8/2015 |
| CN | 106176074 | B1 | 12/2016 |
| CN | 105380759 | B | 3/2017 |
| CN | 105434121 | B | 5/2017 |

(Continued)

OTHER PUBLICATIONS

Yusuke Sugahara et al., "A Novel Stair-Climbing Wheelchair with Transformable Wheeled Four-Bar Linkages," Oct. 2010, IEEE, 2010 IEEE/RSJ International Conference on Intelligent Robots and Systems, pp. 3333-3339 (Year: 2010).*

(Continued)

*Primary Examiner* — Aniss Chad
*Assistant Examiner* — Madison R Inserra
(74) *Attorney, Agent, or Firm* — DINSMORE & SHOHL LLP

(57) ABSTRACT

A support device includes a base portion, a leg coupled to the base portion, the leg including an upper segment, a central segment pivotally coupled to the upper segment at a front wheel, a lower segment pivotally coupled to the central segment, a rear wheel coupled to the lower segment, and an engagement member coupled to the lower segment, where the engagement member is positionable between a disengaged position, in which at least a portion of the engagement member is positioned above the rear wheel, and an engaged position, in which at least a portion of the engagement member is positioned at or below the rear wheel.

14 Claims, 17 Drawing Sheets

(56) References Cited

FOREIGN PATENT DOCUMENTS

| | | | |
|---|---|---|---|
| CN | 104970931 | B | 6/2017 |
| CN | 107696914 | A | 2/2018 |
| CN | 208808886 | U | 5/2019 |
| CN | 209757397 | U | 12/2019 |
| EP | 0482744 | B1 | 11/1996 |
| KR | 101505573 | B1 | 3/2015 |

OTHER PUBLICATIONS

"Step Climbing Wheelchair," Aug. 3, 2015, UTS Robotics Institute, https://www.youtube.com/watch?v=vekwjQ4Hqzw (Year: 2015).*

Kim, Dongmok et al., "Optimal design and kinetic analysis of a stair-climbing mobile robot with rocker-bogie mechanism," Dec. 23, 2011, Elsevier, Mechanism and Machine Theory vol. 50, pp. 90-108 (Year: 2011).*

Seralathan, S. et al., "Static structural analysis of wheel chair using a rocker bogie mechanism," Jun. 17, 2020, Elsevier, Materials Today: Proceedings vol. 33 Part 7, pp. 3583-3590 (Year: 2020).*

* cited by examiner

SUPPORT DEVICES INCLUDING MOVABLE SEGMENTS AND METHODS FOR OPERATING THE SAME

TECHNICAL FIELD

The present specification generally relates to support devices including movable segments and methods for operating the same.

BACKGROUND

Support devices, such as wheelchairs, assistive robots, mechanized walkers, and the like, are conventionally used to assist users in moving from one location to another. For example, motorized wheelchairs can move a user between locations, and assistive robots and mechanized walkers can provide support to a user moving between locations. In some instances, assistive robots and mechanized walkers may also assist a user in carrying objects between locations.

SUMMARY

Conventional support devices can include wheels that move along a surface, such as a floor or the ground. Many stores, homes, and other locations may include obstacles, such as a curb or stairs, which presents a challenge for conventional support devices. Support devices according to embodiments described herein generally include legs having movable segments that allow the support device to traverse obstacles, such as curbs, stairs, or the like.

In one embodiment, a support device includes a base portion, a leg coupled to the base portion, the leg including an upper segment, a central segment pivotally coupled to the upper segment at a front wheel, a lower segment pivotally coupled to the central segment, a rear wheel coupled to the lower segment, and an engagement member coupled to the lower segment, where the engagement member is positionable between a disengaged position, in which at least a portion of the engagement member is positioned above the rear wheel, and an engaged position, in which at least a portion of the engagement member is positioned at or below the rear wheel.

In another embodiment, a support device includes a base portion, a leg coupled to the base portion, the leg including an upper segment pivotally coupled the base portion, a lower segment pivotally coupled to the upper segment at a lower joint, a rear wheel coupled to the lower segment, and a rotating bracket pivotally coupled to the upper segment and the lower segment at the lower joint, where a front wheel and an engagement wheel are fixedly coupled to one another by the rotating bracket.

In another embodiment, a method for moving a support device onto an obstacle includes moving a rear wheel and a front wheel of the support device along a surface, where the front wheel and the rear wheel are coupled to a leg that is pivotally coupled to a base portion of the support device, the leg including an upper segment, a central segment pivotally coupled to the upper segment at the front wheel, and a lower segment pivotally coupled to the central segment, and moving an engagement member coupled to the lower segment from an disengaged position in which the engagement member is in a disengaged position, in which the engagement member is positioned above the rear wheel, to an engaged position in which the engagement member is positioned at or below the rear wheel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to support devices that include legs having one or more wheels. The legs further include an engagement member that can be selectively engaged with a surface or an obstacle to support the support device, while the one or more wheels of the support device are moved upward onto or downward off of an obstacle.

Figure 1:
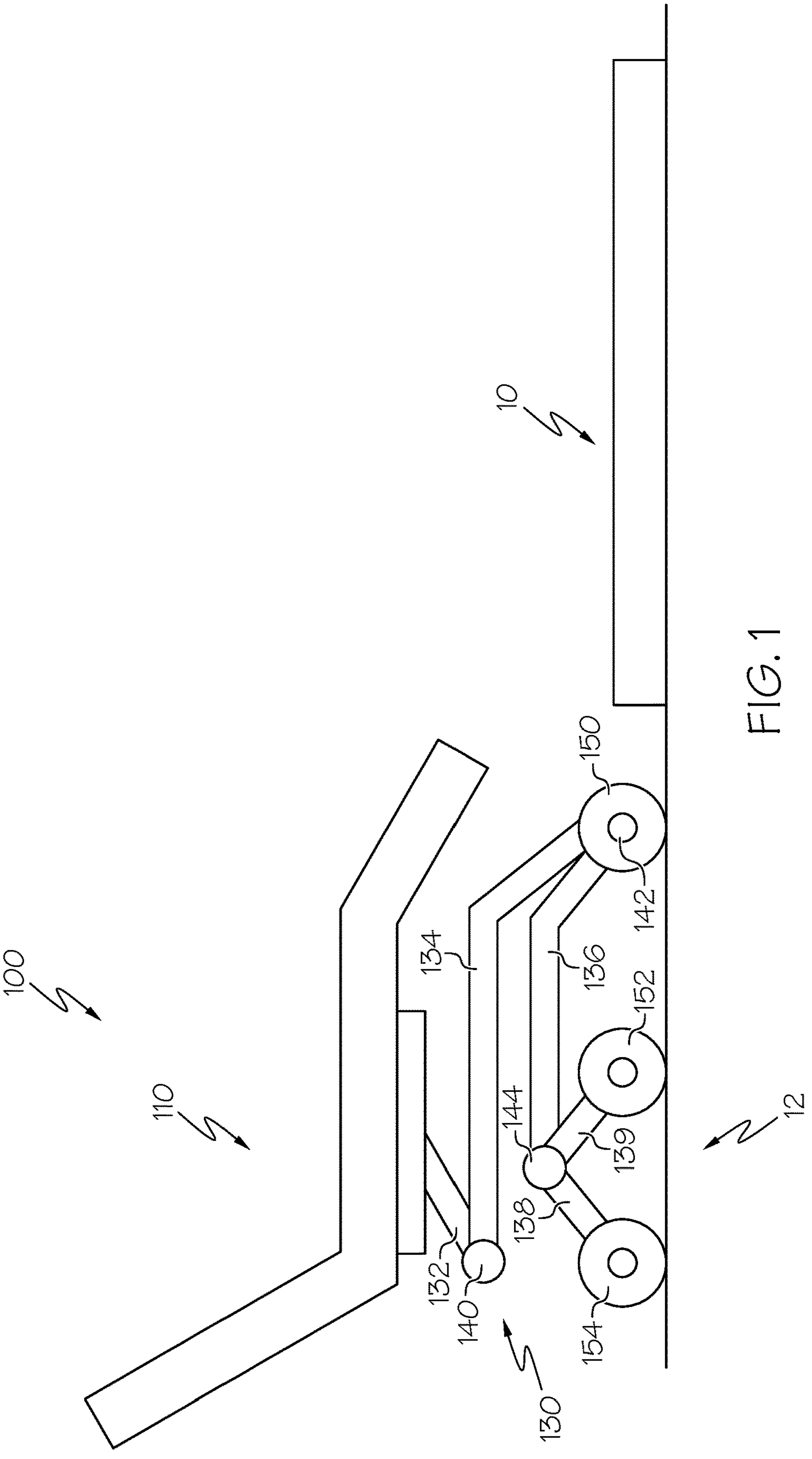
FIG. 1 schematically depicts a side view of a support device including a leg pivotally coupled to a base portion, according to one or more embodiments shown and described herein.

Referring initially to FIG. 1 a side view of a support device 100 is schematically depicted. In embodiments, the support device 100 includes a base portion 110. In some embodiments, the support device 100 is a wheelchair that supports a person, and the base portion 110 may include a seat or the like. In some embodiments, the support device 100 may include an assistive robot, a mechanized walker, or the like, and the base portion 110 may include a base of the robot or the mechanized walker. In some embodiments, the base portion 110 may be structurally configured to carry items, for example groceries or other items that a user wishes to move from one location to another.

In embodiments, the support device 100 includes a leg 130 coupled to the base portion 110. For example, in the embodiment depicted in FIG. 1, the leg 130 is coupled to the base portion 110 by a connecting segment 132 and a connecting joint 140. An upper segment 134, in the embodiment depicted in FIG. 1, is coupled to the base portion 110 through the connecting segment 132 and the connecting joint 140, however, it should be understood that this is merely an example. In embodiments described herein, the upper segment 134 may be directly coupled to the base portion 110.

The leg 130 generally includes the upper segment 134 and a central segment 136 pivotally coupled to the upper segment 134 at a front wheel 150. For example, in the embodiment depicted in FIG. 1, the upper segment 134 is pivotally coupled to the central segment 136 at an upper joint 142 that is positioned at the front wheel 150. While in the side view depicted in FIG. 1 a single leg 130 is visible, it should be understood that support devices 100 according to the present disclosure may include any suitable number of legs 130.

In the embodiment depicted in FIG. 1 the leg 130 further includes a lower segment 138 pivotally coupled to the central segment 136 at a lower joint 144, and a rear wheel 154 coupled to the lower segment 138.

The leg 130 further includes an engagement member 139 coupled to the lower segment 138. In embodiments, the engagement member 139 is member is positionable between a disengaged position, in which at least a portion of the engagement member 139 is positioned above the rear wheel 154, and an engaged position, in which at least a portion of the engagement member 139 is positioned at or below the rear wheel 154, as described in greater detail herein. While in the embodiment depicted FIG. 1, the engagement member 139 is positioned between the front wheel 150 and the rear wheel 154, it should be understood that this is merely an example.

In some embodiments and as depicted in FIG. 1, the engagement member 139 includes a wheel 152, however, it should be understood that this is merely an example. In embodiments according to the present application, the engagement member 139 may include any structure suitable for engaging a surface 12, for example and without limitation, a foot, a pad, or the like.

In embodiments, one or more of the front wheel 150, the rear wheel 154, and the engagement wheel 152 may include a mecanum wheel, an omni-wheel, or the like. By including a mecanum wheel and/or an omni-wheel, a turning radius of the support device 100 may be reduced and/or the support device 100 may move in a lateral direction.

Figure 2:
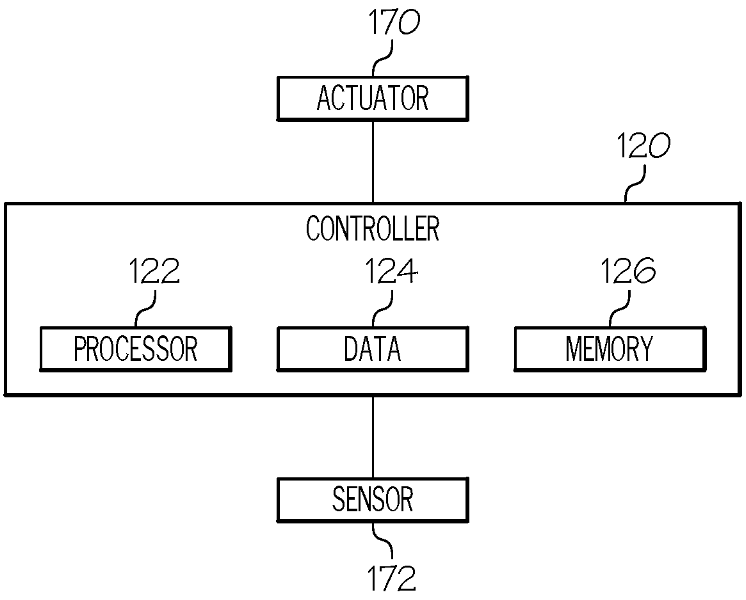
FIG. 2 schematically depicts a control diagram of the support device of FIG. 1, according to one or more embodiments shown and described herein.

Referring to FIG. 2, in some embodiments, the support device 100 includes a controller 120 that may direct one or more components of the support device 100, as described in greater detail herein. As illustrated, the controller 120 includes a processor 122, a data storage component 124, and/or a memory component 126. The memory component 126 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 120 and/or external to the controller 120.

The memory component 126 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface may also included in the controller 120, and may be implemented as a bus or other communication interface to facilitate communication among the components of the controller 120.

The processor 122 may include any processing component operable to receive and execute instructions (such as from a data storage component 124 and/or the memory component 126). It should be understood that while the components in FIG. 2 are illustrated as residing within the controller 120, this is merely an example, and in some embodiments, one or more of the components may reside external to the controller 120. It should also be understood that, while the controller 120 is illustrated as a single device, this is also merely an example.

In embodiments, the controller 120 is communicatively coupled to one or more components of the support device 100. For example, in the embodiment depicted in FIG. 2, the controller 120 is communicatively coupled to a sensor 172 and an actuator 170. The sensor 172 may include a sensor structurally configured to detect an obstacle 10 (FIG. 1) positioned near the support device 100. The sensor 172 may include, for example and without limitation, a radio detection and ranging (RADAR) sensor, a light detection and ranging (LIDAR) sensor, a laser sensor, a camera, or the like positioned on the support device 100 to detect the height and position of objects (e.g., obstacles) positioned around the support device 100.

In some embodiment, the sensor 172 may include a sensor structurally configured to receive a user input, for example, a joystick, an alpha-numeric keypad, a touchscreen, or the like.

In embodiments, the actuator 170 may include any suitable device structurally configured to move the leg 130 of the support device 100. More particularly, the actuator 170 may move any of the upper segment 134, the central segment 136, the lower segment 138 and the engagement member 139 with respect to one another. The actuator 170 may also move one or more of the front wheel 150, the rear wheel 154, and the engagement wheel 152. For example, the actuator 170 may rotate one or more of the front wheel 150, the rear wheel 154, and the engagement wheel 152 to provide the support device 100 with mobility along the surface 12. The actuator 170 may include any suitable actuator, and may include for example and without limitation, an electric motor, a hydraulic pump, or the like. While a single actuator 170 is depicted in FIG. 2, it should be understood that the support device 100 may include any suitable number of actuators to move the upper segment 134, the central segment 136, the lower segment 138 and the engagement member 139, the front wheel 150, the rear wheel 154, and/or the engagement wheel 152.

Figure 3:
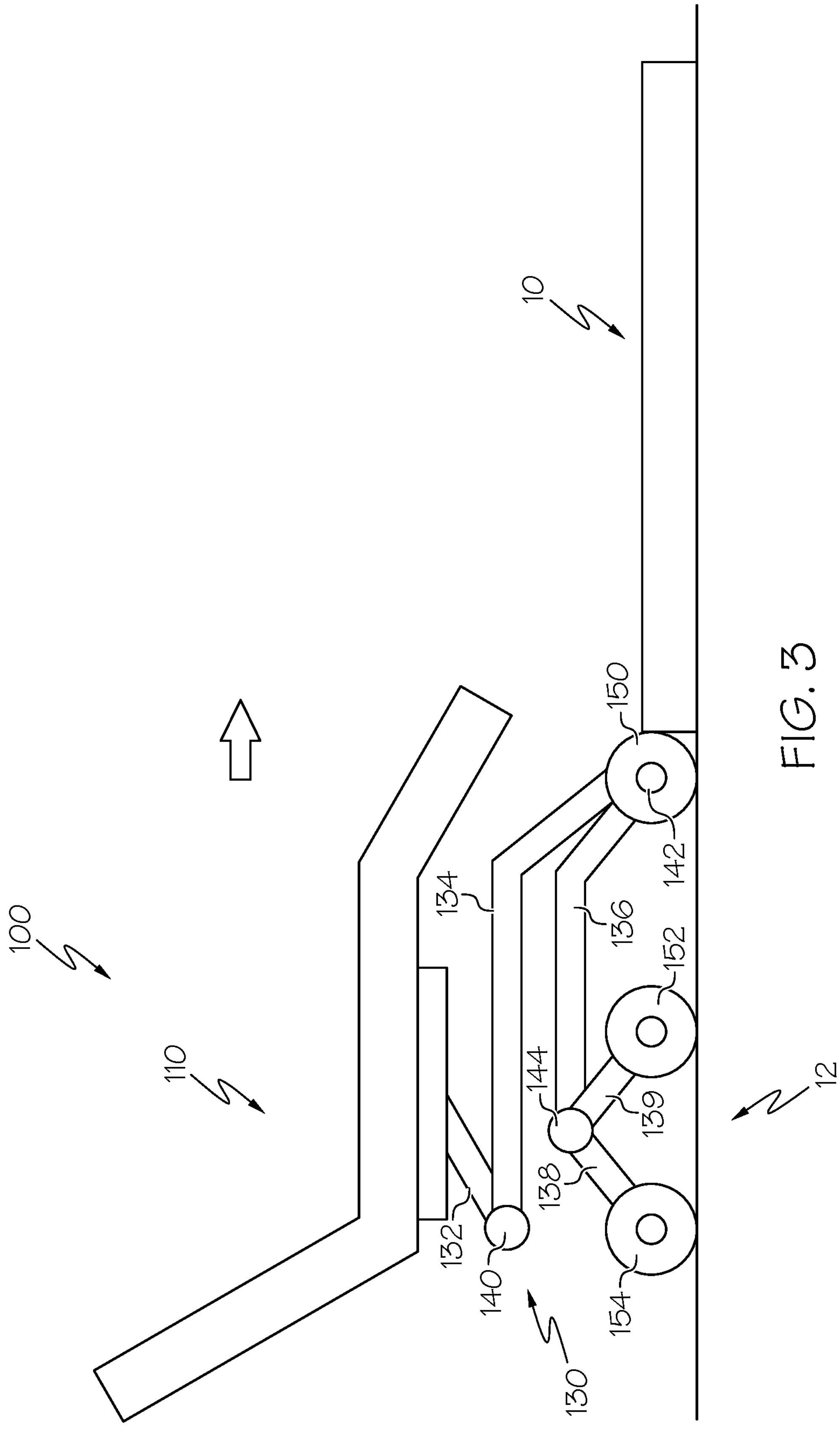
FIG. 3 schematically depicts a side view of the support device of FIG. 1 approaching an obstacle, according to one or more embodiment shown and described herein.

Referring to FIGS. 2 and 3, in operation as the support device 100 approaches the obstacle 10, the controller 120 may receive a signal from the sensor 172 indicative of the presence of the obstacle 10. In response to receiving the signal from the sensor 172, the controller 120 may direct the actuator 170 to move the engagement member 139 to move to the engaged position. As shown in FIG. 3, in the engaged position, the engagement wheel 152 engages the surface 12. In embodiments, the engagement wheel 152 may be positioned at or below the rear wheel 154 in the engaged position.

Figure 4:
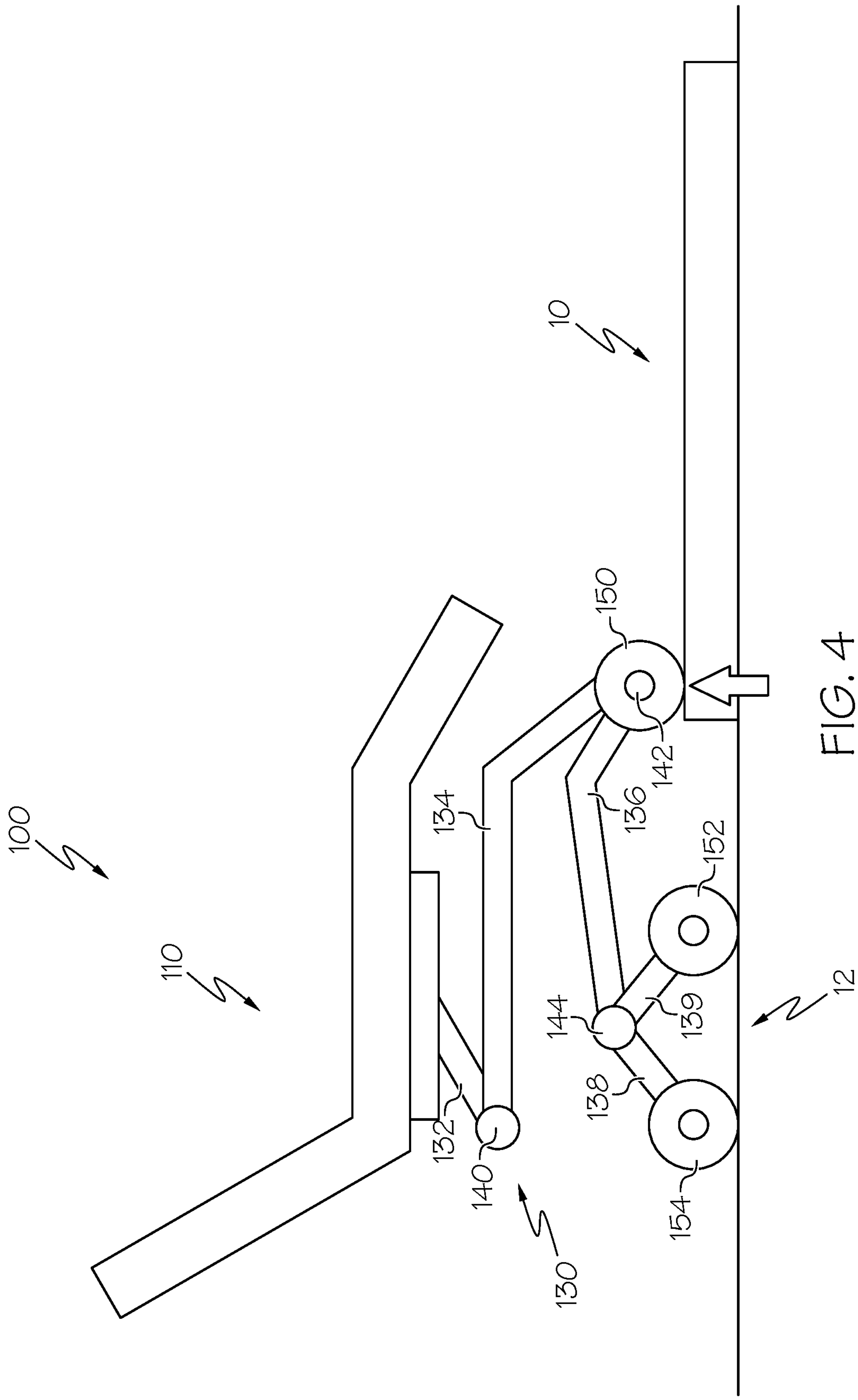
FIG. 4 schematically depicts a side view of the support device of FIG. 1 with a front wheel positioned on the obstacle, according to one or more embodiments shown and described herein.

Referring to FIGS. 2 and 4, with the engagement wheel 152 and the rear wheel 154 engaged with the surface 12, the controller 120 may direct the actuator 170 to move the front wheel 150 upward in a vertical direction. In particular, the controller 120 may direct the actuator 170 to move the front wheel 150 upward in the vertical direction, and may rotate the engagement wheel 152 and/or the rear wheel 154 to move the front wheel 150 onto a surface of the obstacle 10. In embodiments, the actuator 170 may move the front wheel 150 upward by rotating the central segment 136 with respect to the lower segment 138 about the lower joint 144.

Figure 5:
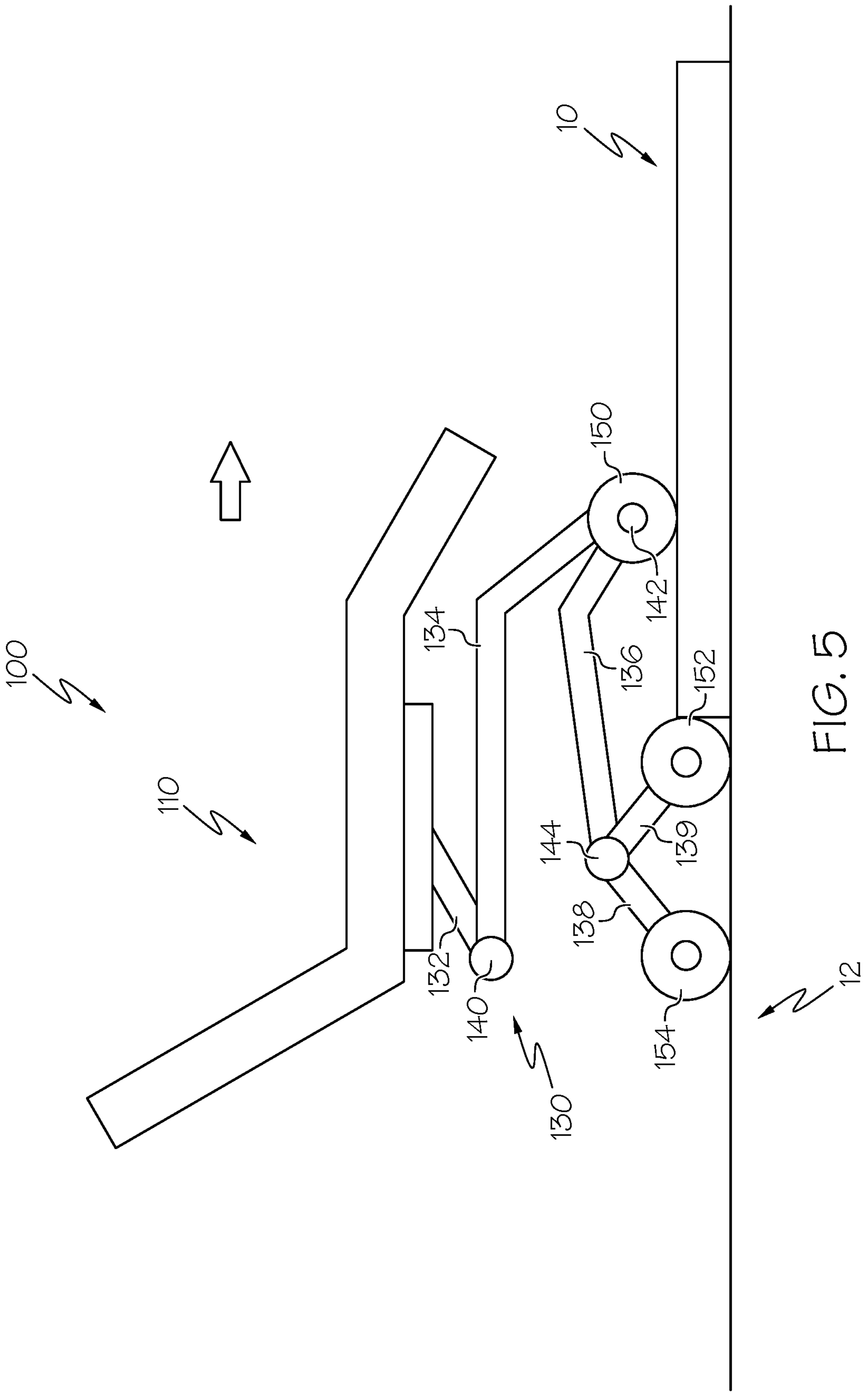
FIG. 5 schematically depicts a side view of the support device of FIG. 1 continuing to move onto the obstacle, according to one or more embodiments shown and described herein.

Referring to FIGS. 2 and 5, the controller 120 may direct the front wheel 150, the engagement wheel 152, and/or the rear wheel 154 to rotate, moving the support device 100 further onto the obstacle 10.

Figure 6:
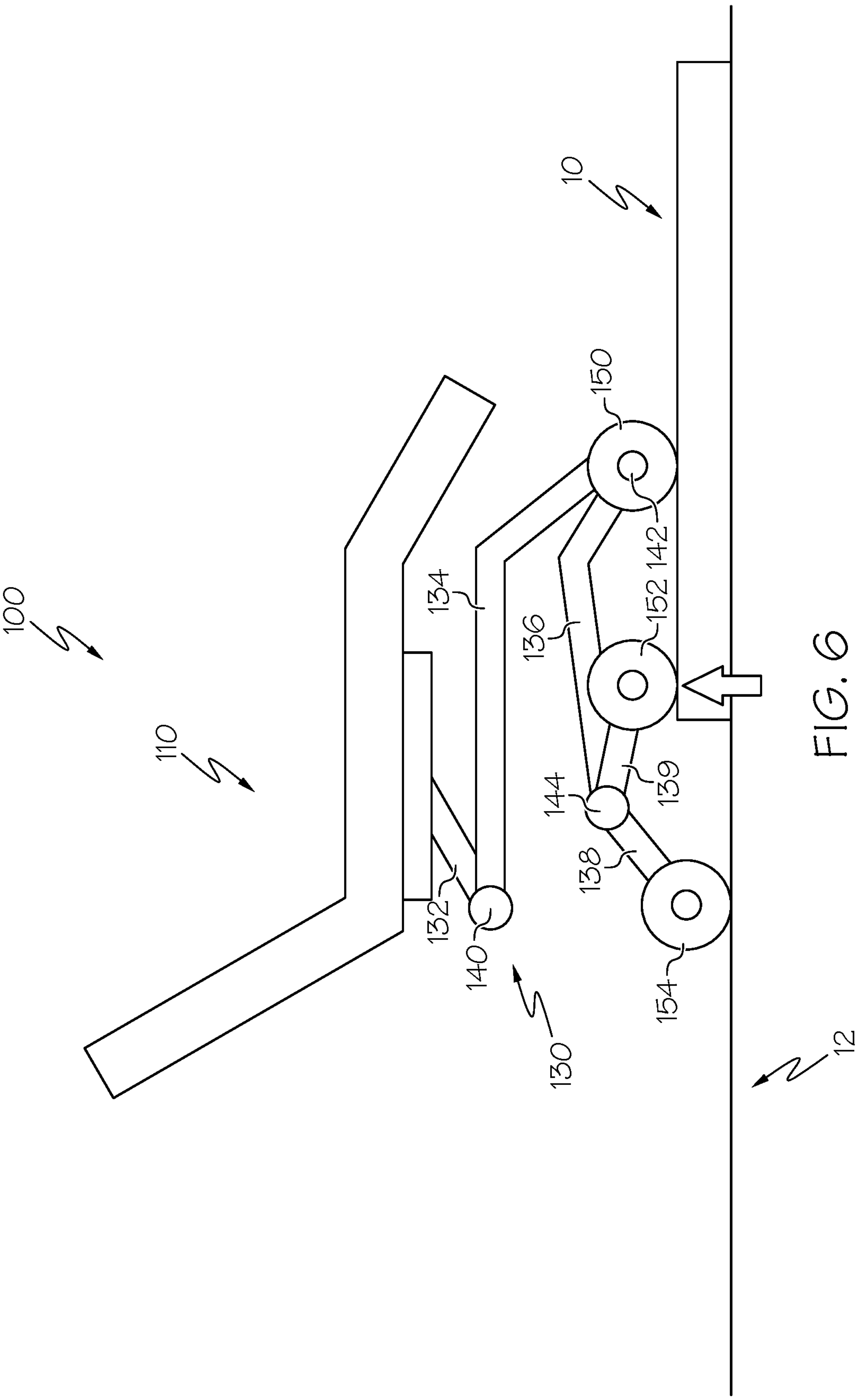
FIG. 6 schematically depicts a side view of the support device of FIG. 1 with the front wheel and a central wheel positioned on the obstacle, according to one or more embodiments shown and described herein.

Referring to FIGS. 2 and 6, with the support device 100 supported on the obstacle 10 by the front wheel 150 and on the surface 12 by the rear wheel 154, the controller 120 may direct the actuator 170 to move the engagement member 139 to move upward in the vertical direction. For example, the controller 120 may direct the actuator 170 to rotate the engagement member 139 about the lower joint 144, such that the engagement wheel 152 can be positioned on the obstacle 10.

Figure 7:
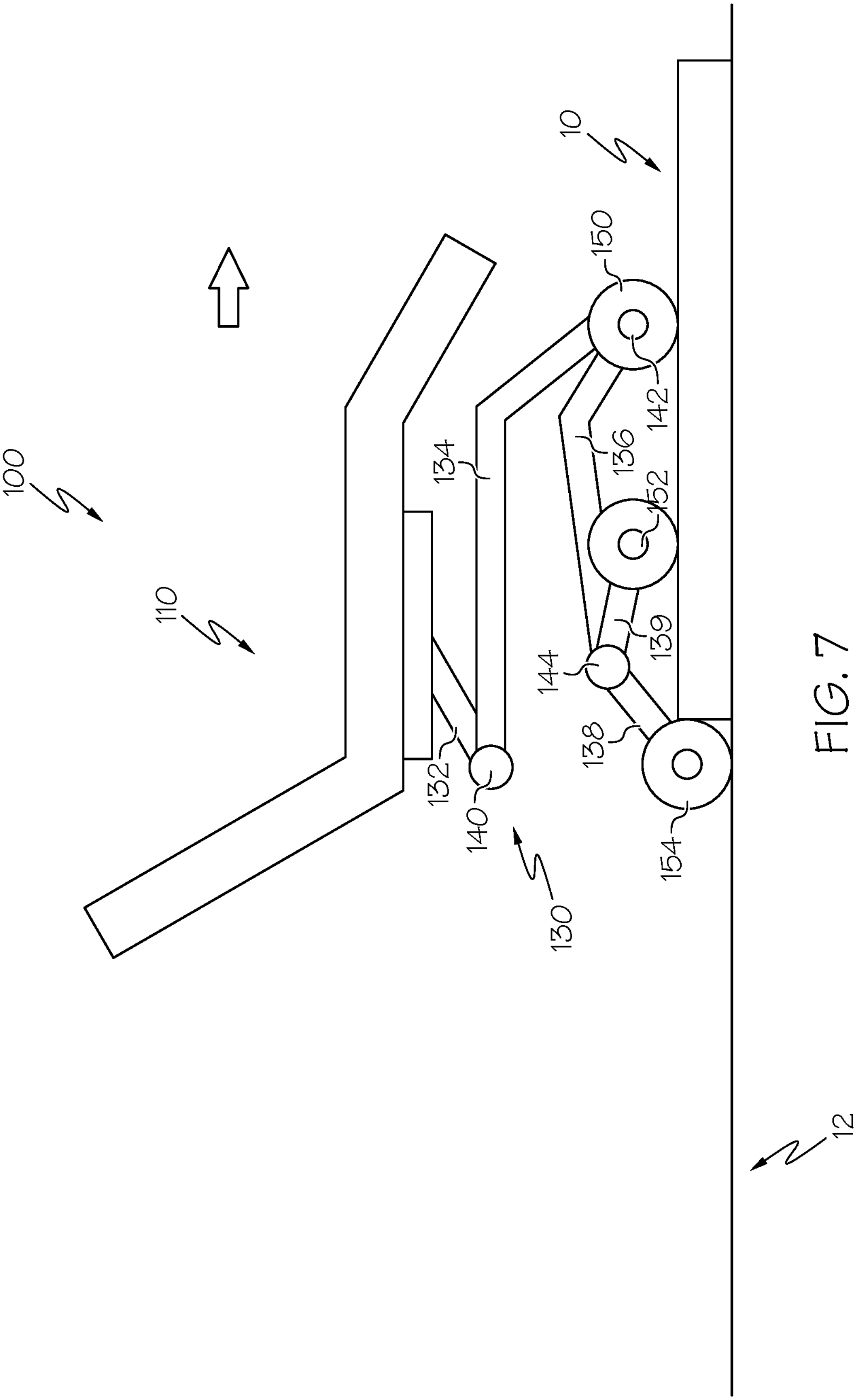
FIG. 7 schematically depicts a side view of the support device of FIG. 1 continuing to move onto the obstacle, according to one or more embodiments shown and described herein.
Figure 8:
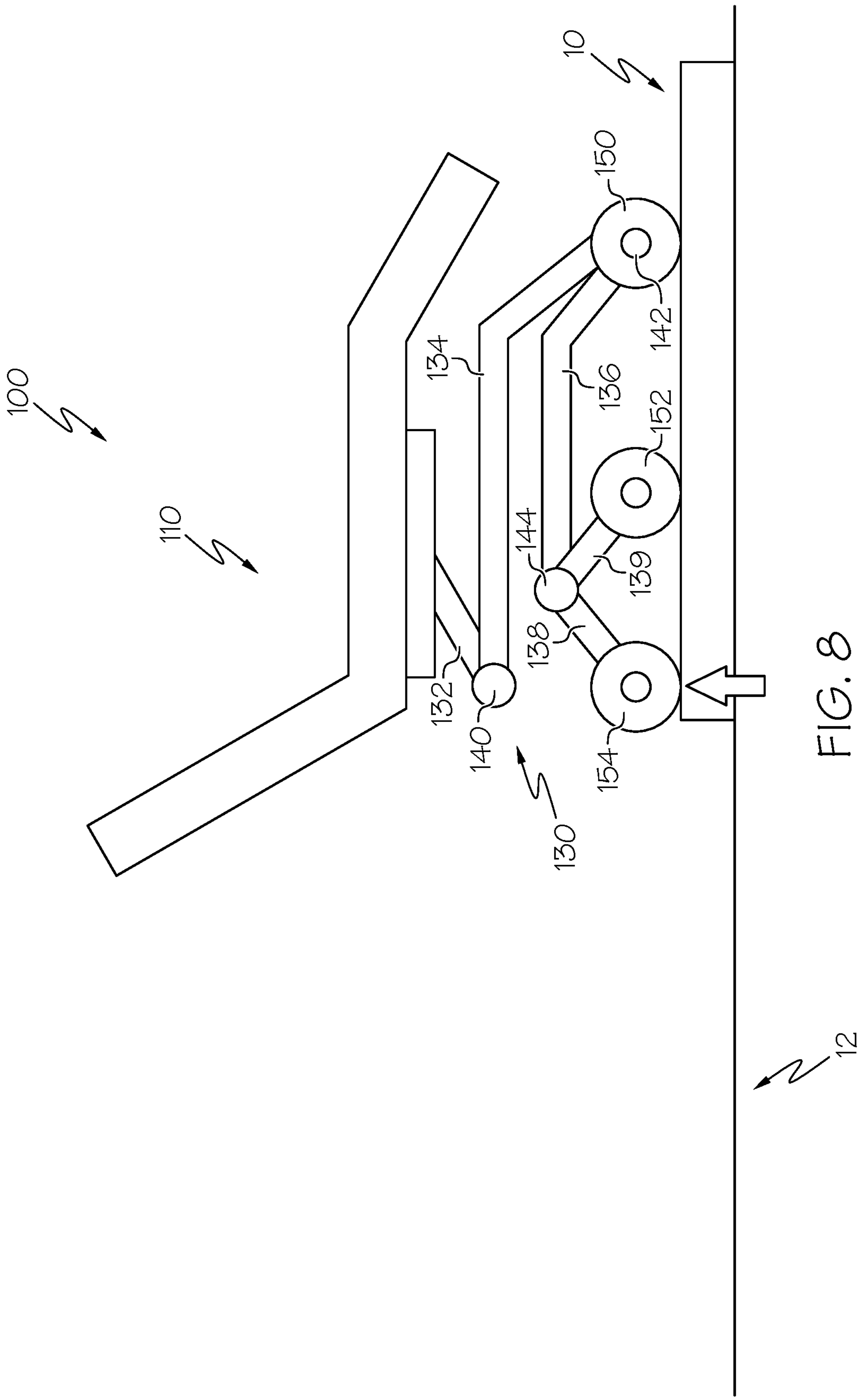
FIG. 8 schematically depicts a side view of the support device of FIG. 1 continuing to move onto the obstacle, according to one or more embodiments shown and described herein.

Referring to FIGS. 2, 7, and 8 with the support device 100 supported on the obstacle 10 by the front wheel 150 and the engagement wheel 152, the controller 120 may direct the actuator 170 to move the rear wheel 154 upward in the vertical direction onto the obstacle 10. For example, the controller 120 may direct the actuator 170 to rotate the lower segment 138 with respect to the central segment 136 about the lower joint 144, such that the rear wheel 154 moves upward onto the obstacle 10. With the rear wheel 154 engaged with the obstacle 10, the engagement member 139 may be moved into the disengaged position, such that the support device 100 is supported on the obstacle 10 by the front wheel 150 and the rear wheel 154.

To move the support device 100 downward off of the obstacle 10, a process similar to that outlined in FIGS. 3-8 is performed in reverse.

Figure 9:
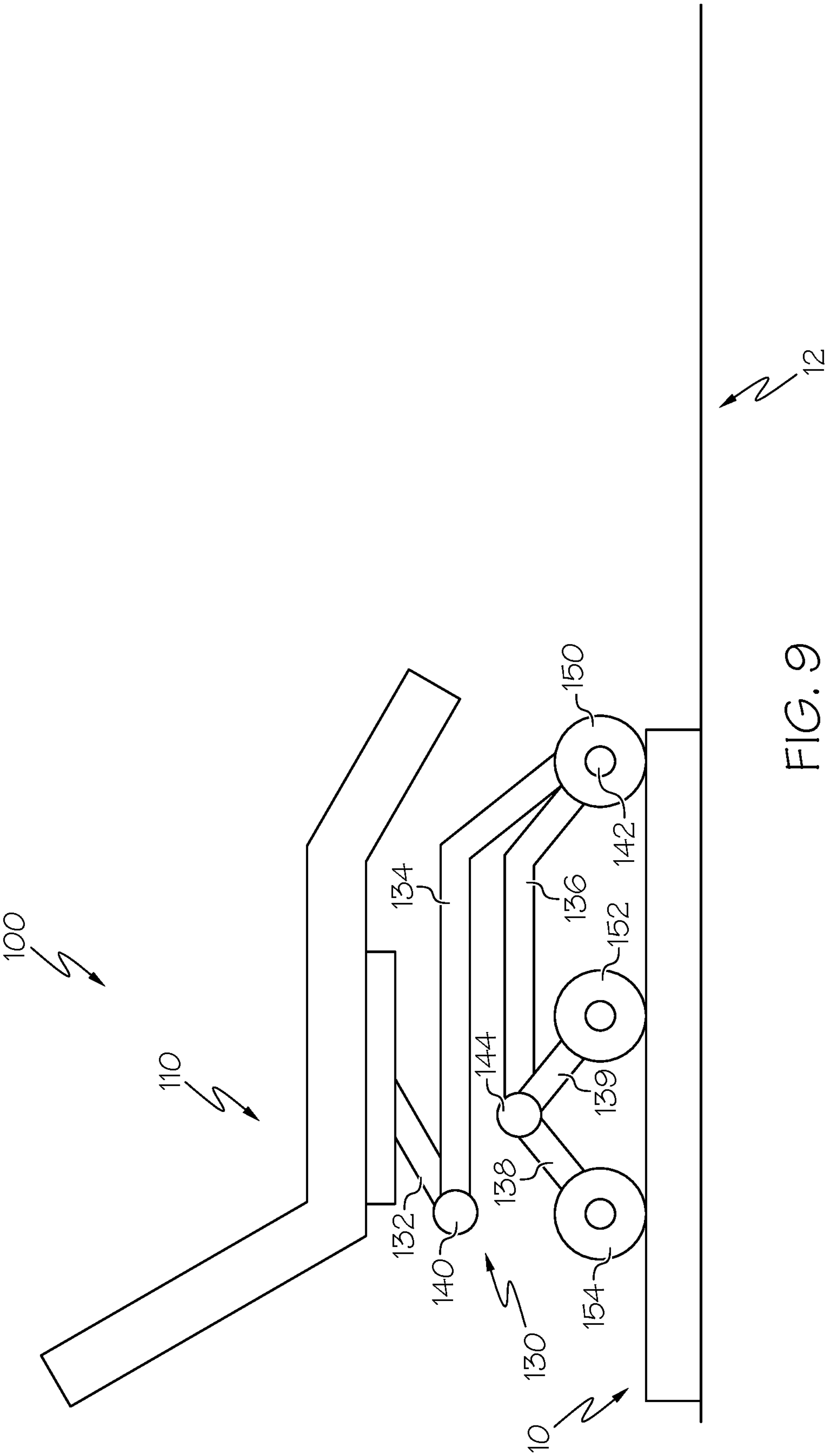
FIG. 9 schematically depicts a side view of the support device of FIG. 1 positioned on the obstacle, according to one or more embodiments shown and described herein.
Figure 10:
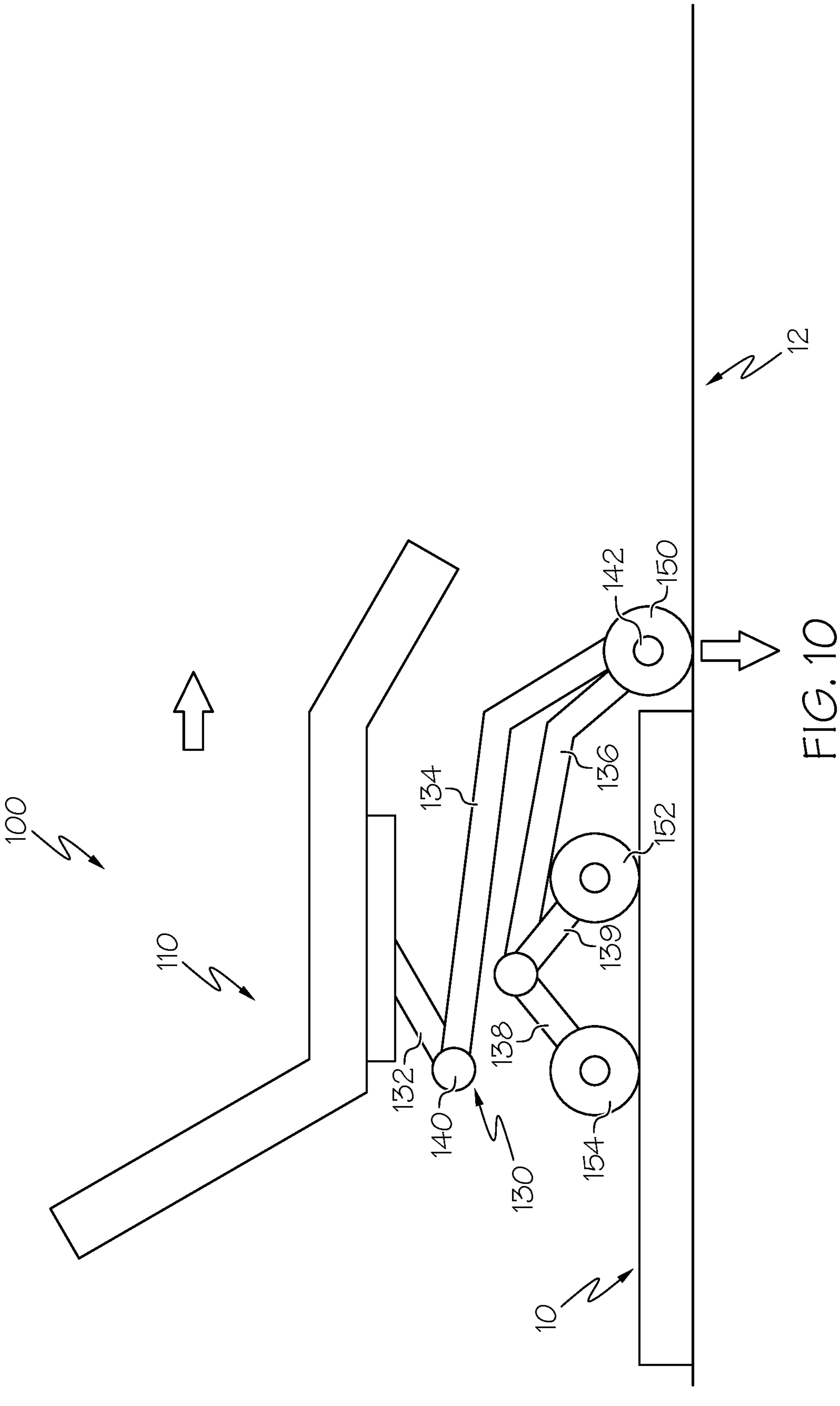
FIG. 10 schematically depicts a side view of the support device of FIG. 1 with the front wheel lowered off of the obstacle, according to one or more embodiments shown and described herein.

For example and referring to FIGS. 2, 9, and 10, in operation as the support device 100 approaches an end of the obstacle 10, the controller 120 may receive a signal from the sensor 172 indicative of the presence of the end of the obstacle 10. In response to receiving the signal from the sensor 172, the controller 120 may direct the actuator 170 to move the engagement member 139 to move to the engaged position. As shown in FIG. 9, in the engaged position, the engagement wheel 152 engages a surface of the obstacle 10.

Referring to FIG. 10, with the engagement wheel 152 and the rear wheel 154 engaged with the surface of the obstacle 10, the controller 120 may direct the actuator 170 to move the front wheel 150 downward in the vertical direction. In particular, the controller 120 may direct the actuator 170 to move the front wheel 150 downward in the vertical direction, and may rotate the engagement wheel 152 and/or the rear wheel 154 to move the front wheel 150 onto the surface 12. In embodiments, the actuator 170 may move the front wheel 150 downward by rotating the central segment 136 with respect to the upper segment 134 about the upper joint 142.

Figure 11:
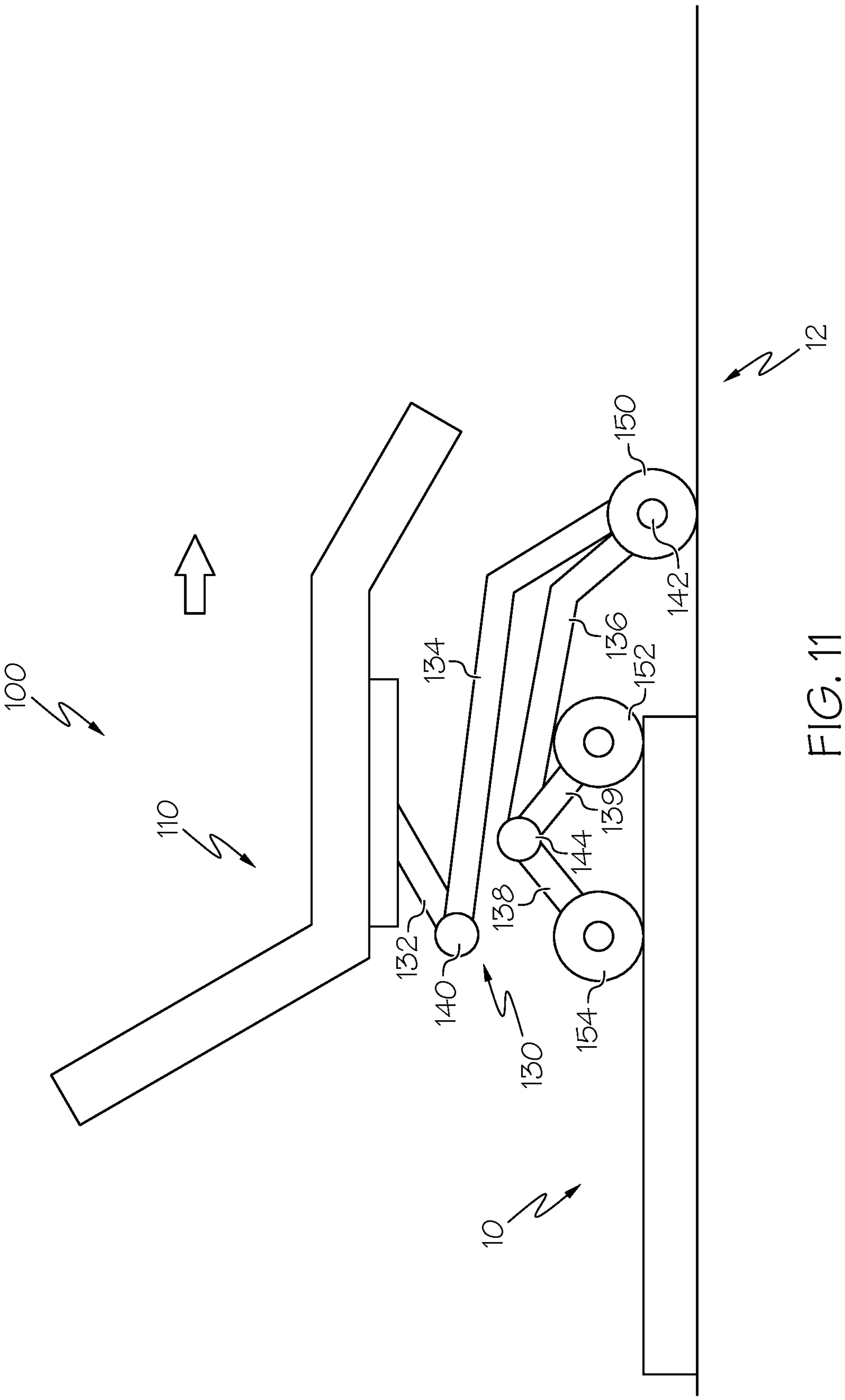
FIG. 11 schematically depicts a side view of the support device of FIG. 1 continuing to move off of the obstacle, according to one or more embodiments shown and described herein.
Figure 12:
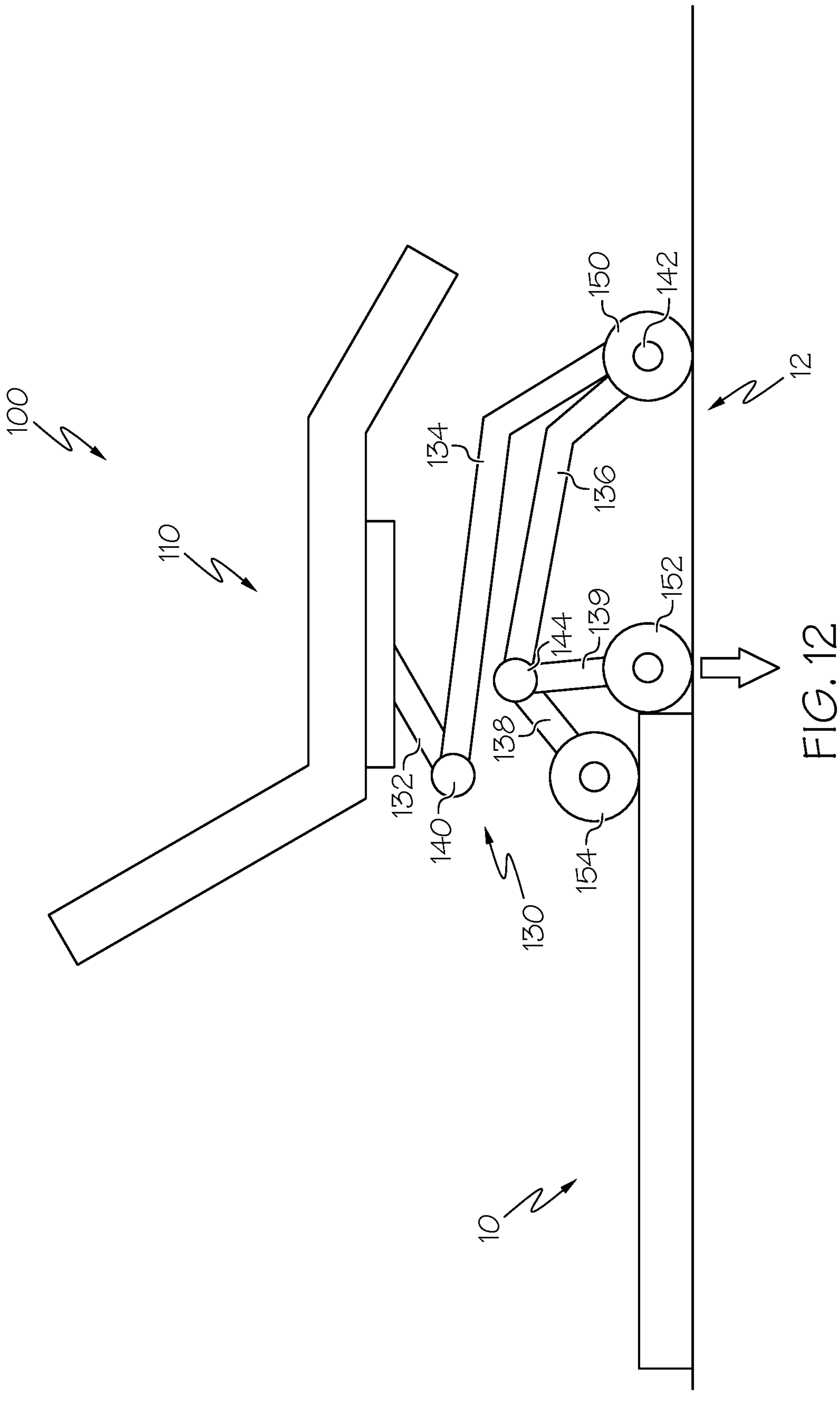
FIG. 12 schematically depicts a side view of the support device of FIG. 1 with the central wheel moved off of the obstacle, according to one or more embodiments shown and described herein.

Referring to FIGS. 2, 11, and 12, with the support device 100 supported on the obstacle 10 rear wheel 154 and the engagement wheel 152, the controller 120 may direct the actuator 170 to move the engagement member 139 downward in the vertical direction onto the surface 12. For example, the controller 120 may direct the actuator 170 to rotate the engagement member 139 about the lower joint 144 to lower the engagement member 139 in the vertical direction, positioning the engagement wheel 152 on the surface 12.

Figure 13:
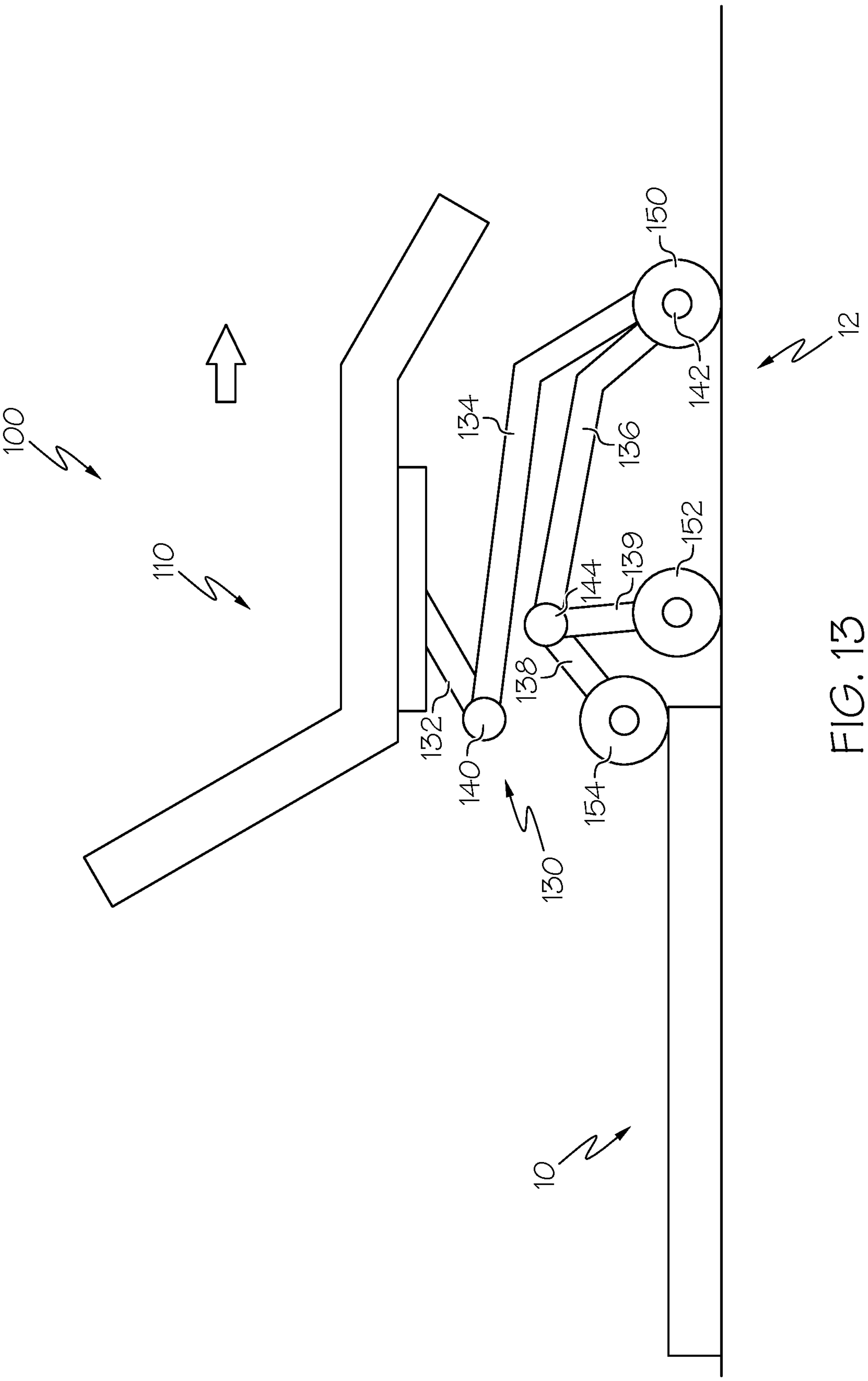
FIG. 13 schematically depicts a side view of the support device of FIG. 1 continuing to move off of the obstacle, according to one or more embodiments shown and described herein.

Referring to FIGS. 2, 12, and 13, with the support device 100 supported on the surface 12 by the engagement wheel 152 and the front wheel 150, the controller 120 may direct the actuator 170 to rotate the front wheel 150, the engagement wheel 152, and/or the rear wheel 154 to move the support device 100 further over the surface 12.

Figure 14:
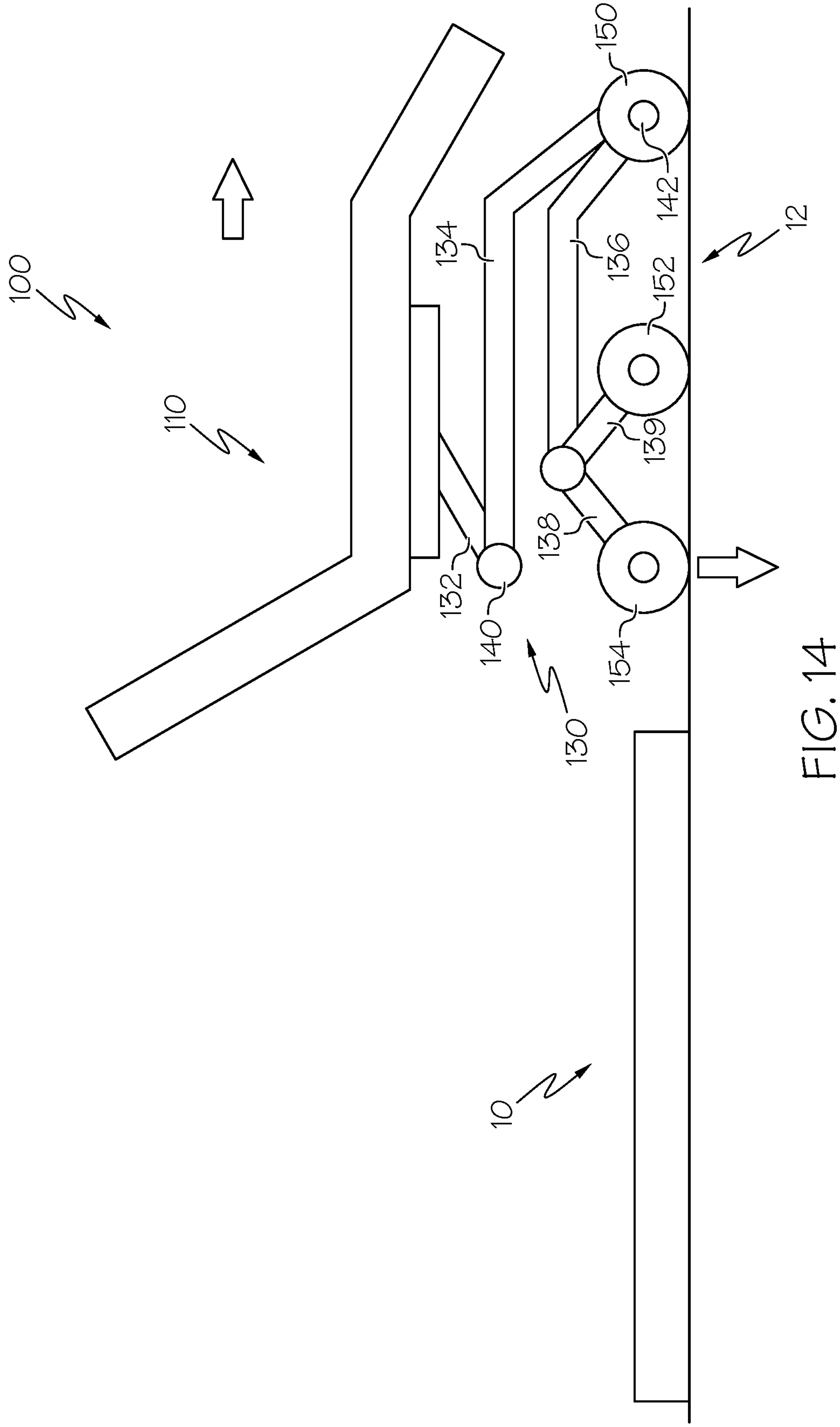
FIG. 14 schematically depicts a side view of the support device of FIG. 1 positioned off of the obstacle, according to one or more embodiments shown and described herein.

Referring to FIGS. 2, 13, and 14, with the support device 100 supported on the surface 12 by the engagement wheel 152 and the front wheel 150, the controller 120 may direct the actuator 170 to move the rear wheel 154 downward in the vertical direction onto the surface 12. For example, the controller 120 may direct the actuator 170 to rotate the lower segment 138 with respect to the central segment 136 about the lower joint 144 to lower the rear wheel 154 onto the surface 12. With the rear wheel 154 engaged with the surface 10, the engagement member 139 may be positioned into the disengaged position. In this way, the engagement member 139 may assist in moving a support device 100 upward onto and downward and off of an obstacle 10, such as a curb, a stair, a step, or the like.

Figure 15:
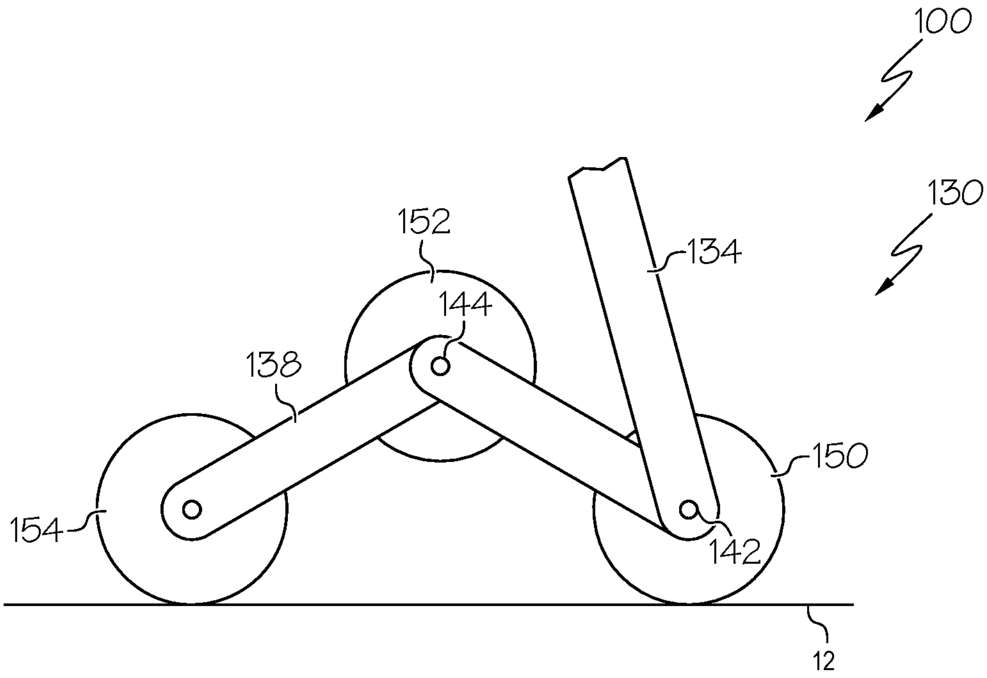
FIG. 15 schematically depicts a side view of another leg of a support device, according to one or more embodiments shown and described herein.
Figure 16:
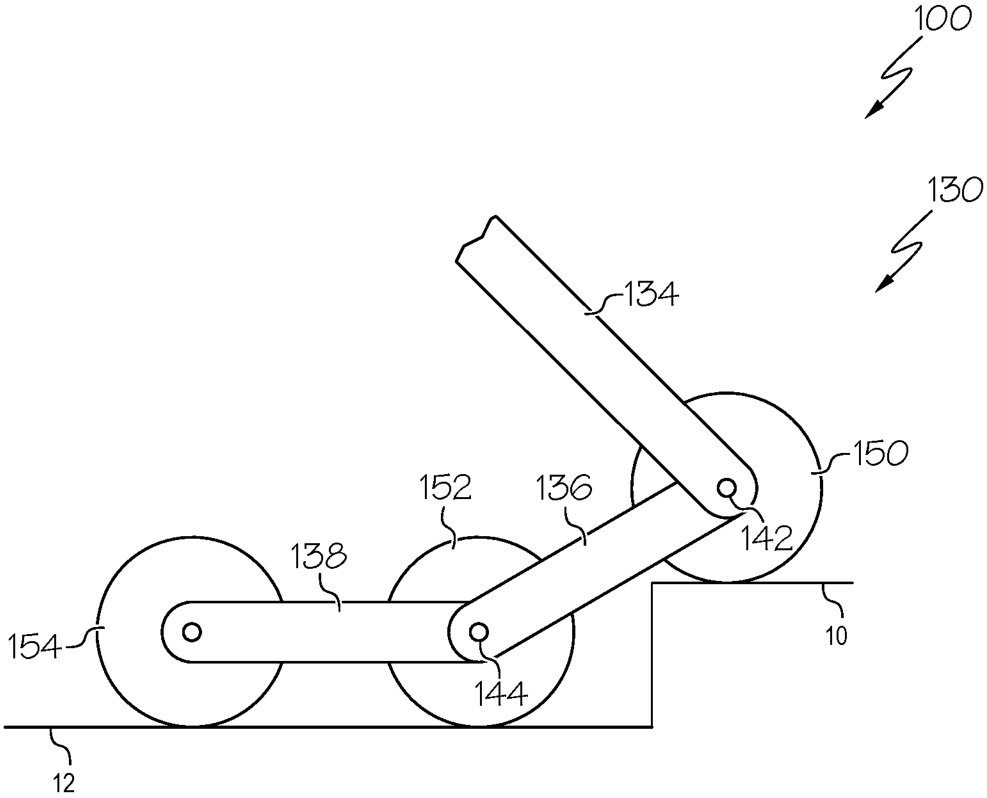
FIG. 16 schematically depicts a side view of the leg of FIG. 15 moving onto an obstacle, according to one or more embodiments shown and described herein.
Figure 17:
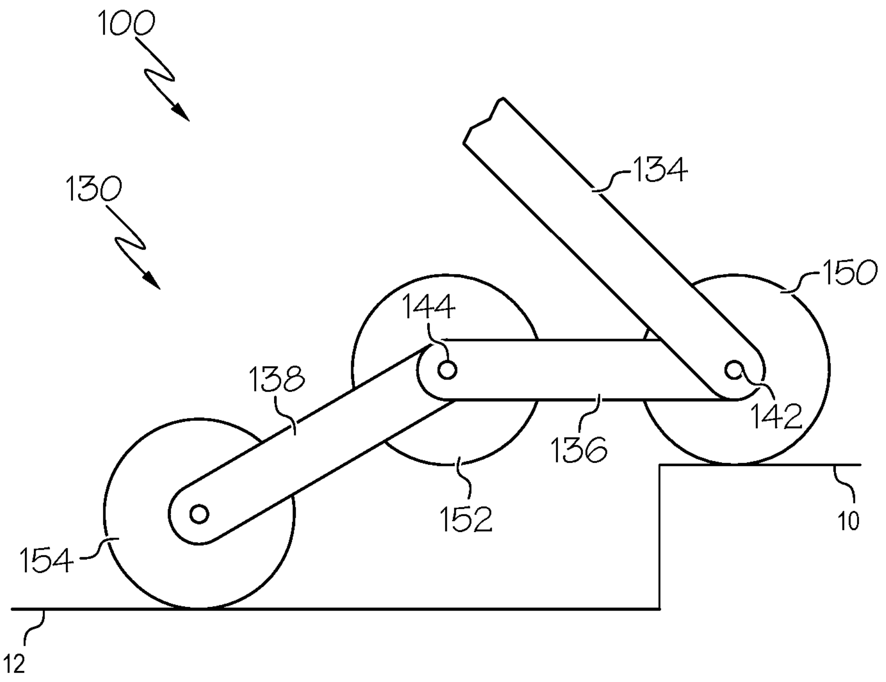
FIG. 17 schematically depicts a side view of the leg of FIG. 15 continuing to move onto the obstacle, according to one or more embodiments shown and described herein.

Referring to FIGS. 15-17, in some embodiments, the engagement member includes the engagement wheel 152 positioned at the lower joint 144. Similar to the embodiment described above and depicted in FIGS. 1-14, the support device 100 may be moved onto the obstacle 10 by moving the front wheel 150 upward onto the obstacle 10 with the support device 100 supported on the surface 12 by the engagement wheel 152 and the rear wheel 154. Similarly, the support device 100 may be moved off of the obstacle 10 by moving the rear wheel 154 downward off of the obstacle 10 with the support device 100 supported on the surface 12 by the front wheel 150 and the engagement wheel 152. Further, in embodiments in which the engagement wheel 152 is positioned at the lower joint 144, the engagement wheel 152 may generally be engaged with the surface 12 during normal operation (e.g., when the support device 100 is not accommodating an obstacle 10), such that the support device 100 is generally supported by the front wheel 150 and the engagement wheel 152. In these embodiments, the rear wheel 154 may be selectively engaged with the surface 12 to move the support device 100 onto or off of the obstacle 10, and may be positioned above the engagement wheel 152 during normal operation (e.g., when the support device 100 is not accommodating an obstacle 10).

Figure 18:
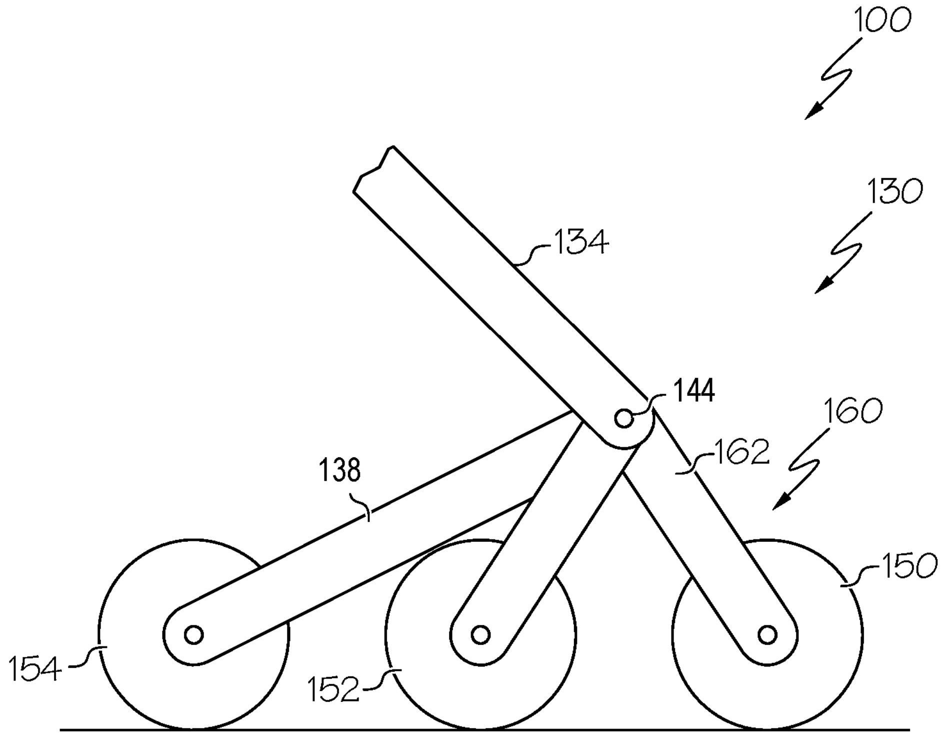
FIG. 18 schematically depicts a side view of another leg of a support device, according to one or more embodiments shown and described herein.

Referring to FIG. 18, in some embodiments, the leg 130 of the support device 100 includes a rotating bracket assembly 160 including rotating bracket 162 pivotally coupled to the upper segment 134 and the lower segment 138 at the lower joint 144. In embodiments, the front wheel 150 and the engagement wheel 152 are fixedly coupled to one another by the rotating bracket 162. For example, the rotating bracket 162 may rotate about the lower joint 144, however, the position of the front wheel 150 with respect to the engagement wheel 152 may be maintained by the rotating bracket 162. In embodiments, the rotating bracket 162 is positionable between an engaged position, in which the engagement wheel 152 is positioned at or below the front wheel 150, and a disengaged position, in which the engagement wheel 152 is positioned above the front wheel 150. Similar to the embodiments described above with respect to FIG. 1-17, the support device 100 may be moved onto the obstacle 10 by moving the front wheel 150 upward onto the obstacle 10 by rotating the rotating bracket 162, with the support device 100 supported on the surface 12 by the engagement wheel 152 and the rear wheel 154. Similarly, the support device 100 may be moved off of the obstacle 10 by rotating the rotating bracket 162 and moving the rear wheel 154 downward off of the obstacle 10 with the support device 100 supported on the surface 12 by the front wheel 150 and the engagement wheel 152.

It should now be understood that embodiments described herein are directed to support devices including legs having one or more wheels. The legs further include an engagement member that can be selectively engaged with a surface or an obstacle to support the support device, while the one or more wheels of the support device are moved upward onto or downward off of an obstacle.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A support device comprising:

a base portion;

a leg coupled to the base portion, the leg comprising:

an upper segment;

a central segment pivotally coupled to the upper segment at a front wheel;

a lower segment pivotally coupled to the central segment;

a rear wheel coupled to the lower segment;

an engagement member coupled to the lower segment, wherein the engagement member is positionable between a disengaged position, in which at least a portion of the engagement member is positioned above the rear wheel, and an engaged position, in which at least a portion of the engagement member is positioned at or below the rear wheel, wherein the engagement member comprises a wheel positioned between the rear wheel and the front wheel.

2. The support device of claim 1, wherein at least one of the front wheel and the rear wheel is a mecanum wheel or an omni-wheel.

3. The support device of claim 1, wherein the lower segment is pivotally coupled to the central segment at a lower joint, and wherein the engagement member is positioned at the lower joint.

4. The support device of claim 1, further comprising an actuator engaged with the leg and a controller communicatively coupled to the actuator, the controller comprising a processor and a non-transitory, processor-readable storage medium comprising a computer readable and executable instruction set that, when executed, causes the actuator to move the engagement member from the disengaged position to the engaged position.

5. The support device of claim 4, wherein the computer readable and executable instruction set, when executed, further causes the actuator to move the front wheel upward in a vertical direction.

6. The support device of claim 5, wherein the computer readable and executable instruction set, when executed, further causes the actuator to move the lower segment, thereby moving the rear wheel upward in a vertical direction.

7. The support device of claim 5, wherein the computer readable and executable instruction set, when executed, further causes the actuator to move the front wheel downward in a vertical direction.

8. The support device of claim 5, wherein the computer readable and executable instruction set, when executed, further causes the actuator to move the engagement member, thereby moving the engagement member downward in a vertical direction.

9. A method for moving a support device onto an obstacle, the method comprising:

moving a rear wheel and a front wheel of the support device along a surface, wherein the front wheel and the rear wheel are coupled to a leg that is pivotally coupled to a base portion of the support device, the leg comprising an upper segment, a central segment pivotally coupled to the upper segment at the front wheel, and a lower segment pivotally coupled to the central segment; and moving an engagement member coupled to the lower segment from a disengaged position, in which the engagement member is positioned above the rear wheel, to an engaged position in which the engagement member is positioned at or below the rear wheel, wherein the engagement member comprises a wheel positioned between the rear wheel and the front wheel.

10. The method of claim 9, wherein moving the engagement member comprises engaging the surface with the engagement member.

11. The method of claim 9, further comprising moving the front wheel upward in a vertical direction.

12. The method of claim 11, further comprising moving the front wheel onto an obstacle that is positioned above the surface.

13. The method of claim 9, further comprising moving the front wheel downward in a vertical direction.

14. The method of claim 9, wherein the method further comprises moving the engagement member along the surface.

* * * * *